United States Patent
Steere et al.

(10) Patent No.: US 7,577,960 B2
(45) Date of Patent: Aug. 18, 2009

(54) SYSTEM AND METHOD FOR MANAGING CACHED OBJECTS USING NOTIFICATIONS BONDS

(75) Inventors: David Cappers Steere, Bellevue, WA (US); Rohan Kumar, Redmond, WA (US); Yun Lin, Kirkland, WA (US); Danilo D'Amico Almeida, Woodinville, WA (US); Shishir Purushottam Pardikar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 10/600,787

(22) Filed: Jun. 19, 2003

(65) Prior Publication Data

US 2004/0261082 A1 Dec. 23, 2004

(51) Int. Cl.
G06F 9/44 (2006.01)
G06F 12/00 (2006.01)
(52) U.S. Cl. ..................... 719/318; 707/201
(58) Field of Classification Search ............... 707/1–10, 707/200–204; 709/201–207, 217–219; 711/118–169; 719/311, 318; 718/106
See application file for complete search history.

(56) References Cited

U.S. PATENT DOCUMENTS

| | | | |
|---|---|---|---|
| 5,911,066 A | 6/1999 | Williams et al. | 395/680 |
| 6,026,413 A | 2/2000 | Challenger et al. | 707/202 |
| 6,161,125 A * | 12/2000 | Traversat et al. | 709/203 |
| 6,216,212 B1 | 4/2001 | Challenger et al. | 711/163 |
| 6,256,712 B1 | 7/2001 | Challenger et al. | 711/141 |
| 6,263,360 B1 * | 7/2001 | Arnold et al. | 709/203 |
| 6,529,921 B1 | 3/2003 | Berkowitz et al. | 707/500.1 |
| 6,553,412 B1 * | 4/2003 | Kloba et al. | 709/219 |
| 6,721,740 B1 * | 4/2004 | Skinner et al. | 707/10 |
| 6,941,326 B2 * | 9/2005 | Kadyk et al. | 707/202 |
| 7,099,926 B1 * | 8/2006 | Ims et al. | 707/10 |
| 2002/0087657 A1 | 7/2002 | Hunt | 709/217 |
| 2003/0004952 A1 | 1/2003 | Nixon et al. | 707/10 |
| 2003/0051068 A1 * | 3/2003 | Eldridge et al. | 709/318 |

(Continued)

FOREIGN PATENT DOCUMENTS

EP    0 714 066 A2    5/1996

(Continued)

OTHER PUBLICATIONS

Barbara, Daniel et al., "Sleepers and Workaholics: Caching Strategies in Mobile Environments", Association of Computing Machinery, SIGMOD Record, vol. 23, No. 2, Jun. 1994, pp. 1-12.

(Continued)

*Primary Examiner*—Li B Zhen
*Assistant Examiner*—Charles E Anya
(74) *Attorney, Agent, or Firm*—Merchant & Gould, P.C.

(57) ABSTRACT

The invention provides a system and method for managing cached objects using notification bonds. A server is configured to manage original objects. A client creates cached objects from the original objects and establishes notification bonds with the server. Each notification bond enables the client to obtain a notification from the server in response to an object related event associated with an original object. The client uses the data in the notification to update the cache object corresponding to the original object without synchronizing other cache objects.

62 Claims, 12 Drawing Sheets

U.S. PATENT DOCUMENTS

2003/0225885 A1* 12/2003 Rochberger et al. ......... 709/226

FOREIGN PATENT DOCUMENTS

| EP | 0 837 407 A1 | 4/1998 |
| EP | 0926608 A2 * | 6/1999 |
| WO | WO 97/04389 | 2/1997 |

OTHER PUBLICATIONS

Yong Woon Park, Kun Hyo Baek, and Ki Dong Chung; "Reducing Network Traffic Using Two-Layered Cache Servers for Continuous Media Data on the Internet"; The $24^{th}$ Annual International Computer Software Applications Conference, Oct. 25-27, 2000, Taipei, Taiwan; pp. 389-394.

* cited by examiner

SYSTEM AND METHOD FOR MANAGING CACHED OBJECTS USING NOTIFICATIONS BONDS

BACKGROUND OF THE INVENTION

In many of today's distributed computing environment, it is often desirable to centrally maintain files that may be shared by multiple clients. A conventional distributed file system is typically used to facilitate the sharing of files. In such a system, a client may obtain access to a shared file by actively interacting with a file server that maintains the shared file. In particular, the client may obtain a file handle from the file server and may modify the file by communicating changes to the file server. Such a file sharing technique is commonly referred to as live sharing. Because large amount of communications between the file server and the clients is necessary for this type of file sharing, the resource overhead associated with live sharing can be very substantial.

Currently, some distributed file systems allow clients to cache file data in the clients' computer memories. In particular, a client may store in its memory local copies of files and directories that are managed by a file server. These local copies facilitate file sharing by enabling the client to readily ascertain what files and directories are available on the server. However, the client must periodically contact the server to synchronize the cached file data in order to ensure that the data are up to date. Synchronizing cached file data is an expensive proposition, especially for a server with many clients that cache file data. For example, when a client reconnects with a server after a period of time of being disconnected, the client must synchronize the entire file data that are cached from the server because the client does not know which files or directories on the server were modified during the disconnection period. Because the work associated with synchronization is proportional to the number of files and directories that are cached, some systems limit the number of files and directories that each client is allowed to cache.

Recently, the mobile computing environment has become increasingly popular. In such an environment, mobile clients can often be disconnected from the network for an extended period of time. This poses a special challenge for distributed file systems. For example, the required synchronization cannot occur while the mobile clients are not connected to the network. In addition, users increasingly want clients to cache a substantial portion of server files and directories. These cached data must be synchronized when the mobile clients are reconnected to the network. Synchronizing of this large amount of data requires a significant amount of client/server communications and computing resources, a situation that is prohibitive in many applications.

An effective and efficient method for caching files by clients in a distributed file system eludes those skilled in the art.

SUMMARY OF THE INVENTION

Briefly stated, the present invention provides a system and method for managing cached objects using notification bonds. In one aspect, the invention is directed to a computer-implemented method for a client to interact with a server using notification bonds. The server manages an original object. The client creates a cached object from the original object and establishes a notification bond with the server. The notification bond enables the client to obtain a notification from the server in response to an object related event associated with the original object.

In another aspect, the invention is directed to a computer-implemented method for a server to interact with a client using notification bonds. The server establishes a notification bond with the client. The server enables the client to cache the object and provides notifications to the client when an object related event occurs.

In still another aspect, the invention is directed to a distributed file system for sharing objects using notification bonds. The distributed file system includes a server configured to manage original objects. The server includes a bond manager configured to issue notification bonds to clients. The distributed file system may also include a client configured to create cached objects associated with the original objects. The client includes a notification handler configured to maintain notification bonds associated with the original objects in conjunction with the server.

DETAILED DESCRIPTION OF THE PREFERRED EMBODIMENT

The inventors of the present invention have determined that a distributed file system that enables clients to efficiently and effectively cache objects managed by a server will greatly improve the system's object-sharing performance. The inventors have also appreciated that enabling a client to rapidly determine which objects on the server were modified while the client was offline will significantly reduce the work associated with revalidating the client's cached objects. Thus, the present invention focuses on a system and method for managing cached objects using notification bonds. The manner in which cached objects are managed by the present invention is very different from conventional file-caching methods. For example, some conventional methods demand each cached file to be updated on a per item basis. These methods require a significant amount of file management resources and can lead to the release of stale cached files to applications and users. Other conventional methods require all of the cached files to be synchronized by comparing them with the corresponding files on the server. Synchronizing the entire cache content by comparison causes a significant performance load on clients, the server, and the network. These problems are exacerbated by techniques to leverage cache states while the client is disconnected from the server, since it is not possible to revalidate while being offline.

In contrast, the present invention enables a client to quickly determine which objects on a server have been changed relative to the corresponding cached objects and to efficiently synchronize those cached objects to match the changed objects. For an object that is cached by the client, a notification bond associated with the object is established. The notification bond enables the client to be notified of changes that were made to the object. The client and the server keep states associated with the notification bond. These notification bond states are typically stored in persistent memory, which enables the client and the server to reestablish theses states after a restart or reboot. These states allow the client to bring the cached object up to date without having to revalidate all of the other cached objects. These and other aspects of the invention will become apparent after reading the following detailed description.

Figure 1:
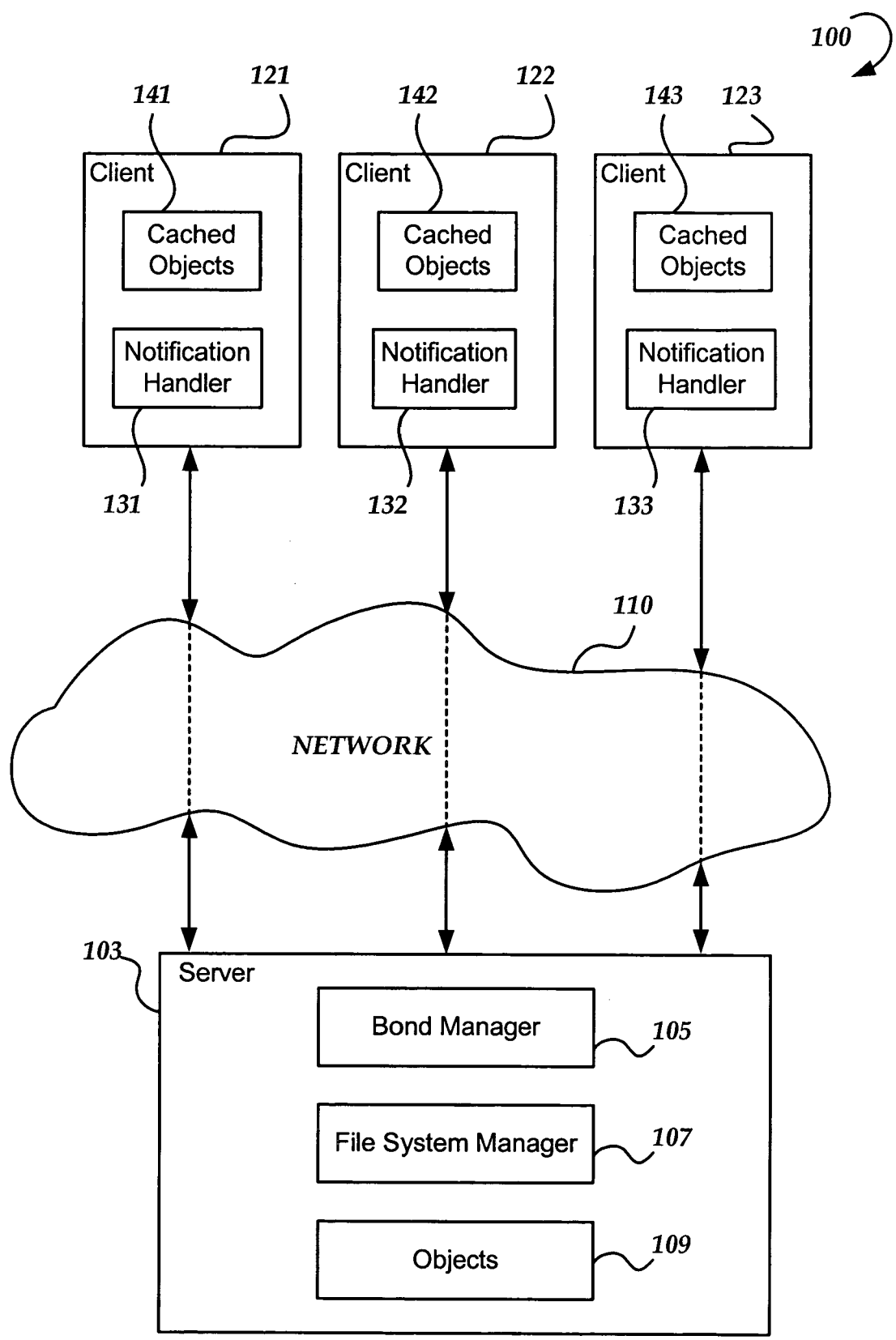
FIG. 1 is a schematic diagram of an exemplary cached objects management system that implements the present invention.

FIG. 1 is a schematic diagram of an exemplary cached objects management system 100 that implements the present invention, in accordance with one embodiment of the invention. In other configurations, cached objects management system 100 may include more or less components than those shown. As shown in the figure, cached objects management system 100 includes components on server 103 and clients 121-123.

Server 103 is a computing device that is configured to manage objects and facilitate sharing of the objects for clients 121-123. Server 103 may include one or more computers. Each computer is typically configured with a memory, which may include computer-readable media, such as RAM, ROM, hard drives, optical drives, etc. In this embodiment, the memory includes a bond manager 105, file system manager 107 and original objects 109. File system manager 107 is a software component of file server 103 and is configured to handle original objects 109 for server 103. An example of file system manger 107 is NTFS developed by Microsoft. Original objects 109 are data structures stored in server 103 that may be shared by clients 121-123. Original objects 109 may be any type of data structures, such as file directories, any kind of files such as executables, data, etc. Original objects 109 are typically stored in mass data storage units such as hard drives. In such mass data storage units, an object may be identified by its storage location in the hard drive, such as volume ID, file ID, file path, etc.

Bond manager 105 is a software component of server 103 and is configured to notify clients of changes to objects that are cached by the clients. Bond manager 105 may be integrated as part of another component such as file system manager 107 or may be implemented as a separate component, such as a filter. Bond manager 105 is configured to coordinate with notification handlers 131-133 to keep cached objects 141-143 up to date. Bond manager 105 will be discussed with more detail in conjunction with FIG. 2. Briefly stated, bond manager 105 establishes notification bonds with notification handlers 131-133 for providing notifications associated with cached objects 141-143. The notifications enable clients 121-123 to determine which cached objects 141-143 need to be updated.

Server 103 is configured to communicate with clients 121-123 through network 110, which may be any type of network such as the Internet or any wide area network (WAN), local area network (LAN), wireless network, etc. Communications between server 103 and clients 121-123 will be discussed in detail in conjunction with FIG. 3. Briefly stated, server 103 is configured to communicate with clients 121-123 for establishing bonds, sending notification, and synchronizing cached objects 141-143, etc. Communications between clients and server are considered computer-readable media.

Clients 121-123 are computing devices that are configured to access objects from server 103. Clients 121-123 may interact with the server 103 with an active communication connection. Clients 121-123 may also function without a connection with server 103. Clients 121-123 are configured to enable users to work directly on them or to serve as a server for other computing devices. Each of the clients 121-123 is configured with a memory, which may include any type of computer-readable media. The memories of the clients 121-123 include cached objects 141-143 and notification handlers 131-133. Cached objects 141-143 are replicated from original objects 109 that are useful to clients 121-123. Cached objects 141-143 may not be synchronized with their corresponding original objects 109 on server 103 if the connections between clients 121-123 and server 103 are not established or are lost. To be useful to clients 121-123, cached objects 141-143 should be synchronized with the corresponding original objects 109. With this invention, clients 121-123 may synchronize cached objects 141-143 using notifications corresponding to the objects.

Notification handlers 131-133 are components of clients 121-123 that handle the communications and data management related to notifications. Notification handlers 131-133 will be discussed in detail in conjunction with FIG. 2. Briefly stated, notification handlers 131-133 are configured to establish notification bonds with server 103 and to handle notifications and cached object synchronization for clients 121-123.

Figure 2:
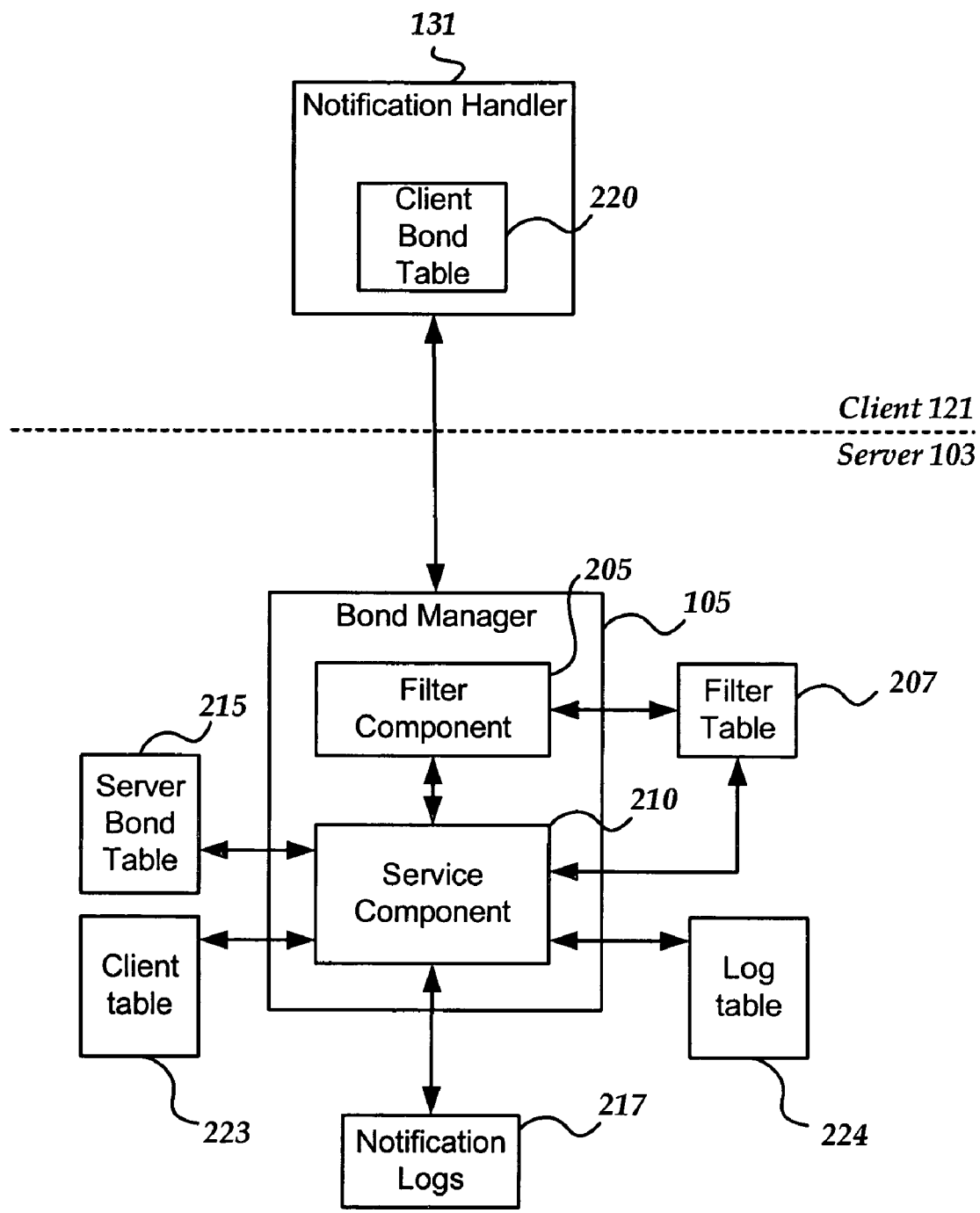
FIG. 2 is a schematic diagram of notification handler and a bond manager.

FIG. 2 is a schematic diagram of notification handler 131 and bond manager 105, in accordance with one embodiment of the invention. In this embodiment, bond manager 105 includes a filter component 205 and a service component 210. Filter component 205 is configured to scan object related events incoming to and outgoing from the file system manager of server 103. These object related events may involve objects that are cached by clients, such as client 121. Bond manager 105 may be configured to create notifications for client 121 in response to these events. Filter component 205 is configured to determine which object related events require notifications using a filter table 207 and to forward these events to service component 210. The filter table 207 identifies objects that require notifications. An exemplary data structure of filter table 207 will be discussed in detail in conjunction with FIG. 4.

Service component 210 is configured to establish notification bonds with clients for receiving notifications regarding changes in objects that are cached by the clients. In this embodiment, service component 210 maintains a server bond table 215 that includes states associated with the notification bonds. Server bond table 215 identifies objects that require notifications and includes the states that enable server component 210 to create notifications for clients. The notifications may be provided to clients in a number of different ways. In one embodiment, service component 210 is configured to maintain notification logs 217 that contain notifications for notification handler 131. One configuration of this embodiment includes configuring service component 210 to enable notification handler 131 to retrieve notification logs 217. Another configuration includes configuring service component 210 to send notification logs 217 to notification handler 131 in response to an event, such as the expiration of a pre-determined time period, the size of notification logs 217 exceeded a threshold value, etc.

In another embodiment, notification handler 131 may be configured to send notifications to notification handler 131 when an active communication link is available. Notification handler 131 may be configured to record notifications in notification logs 217 when an active communication link is not available and to provide notification logs 217 to notification handler 131 when the communication link is reestablished.

Notification logs 217 may be logically implemented in many ways. In one embodiment, notification logs 217 are implemented as a multiplexed log such that notifications for multiple clients may be included in the log. In another embodiment, notification logs 217 are implemented as per-client logs so that each client has a separate notification log. Service component 210 may maintain a log table 224 that includes data for identifying which portions of a multiplexed log are associated with a particular client or which per-client log is associated with the client. Service component 210 may be configured to send or make available the entire notification logs 217 or only the portion of the logs that applies to client 121. Relevant data in notification logs 217 may be used by notification handler 131 to bring the cached objects of client 121 up to date.

Service component 210 is also configured to determine whether a client that made changes to an object has a notification bond on the object and to avoid creating a notification for that client. Service component 210 may make the determination by discovering a client identifier in the data related to an object change event and matching the client identifier with the ones in a client table 223, which contains identification information for each client that is associated with a notification bond. Service component 210 may also be configured to provide and update filter table 207 for filter component 205.

Notification handler 131 is configured to interact with bond manager 105 to establish notification bonds on objects that are cached by client 121. In this embodiment, notification handler 131 maintains a client bond table 220 that includes states associated with established notification bonds. Client bond table 220 will be discussed in more detail in conjunction with FIG. 6. Briefly stated, client bond table 220 includes states about notification bonds that have been established on one or more servers. Ideally, the states in client bond table 220 should match the corresponding data in server bond table 215. However, the states may not be the same due to disconnects and crashes. On reconnection, the client and the server will re-synchronize the states. Synchronizing the states in the tables may serve to revalidate the cached objects in client 121.

Figure 3:
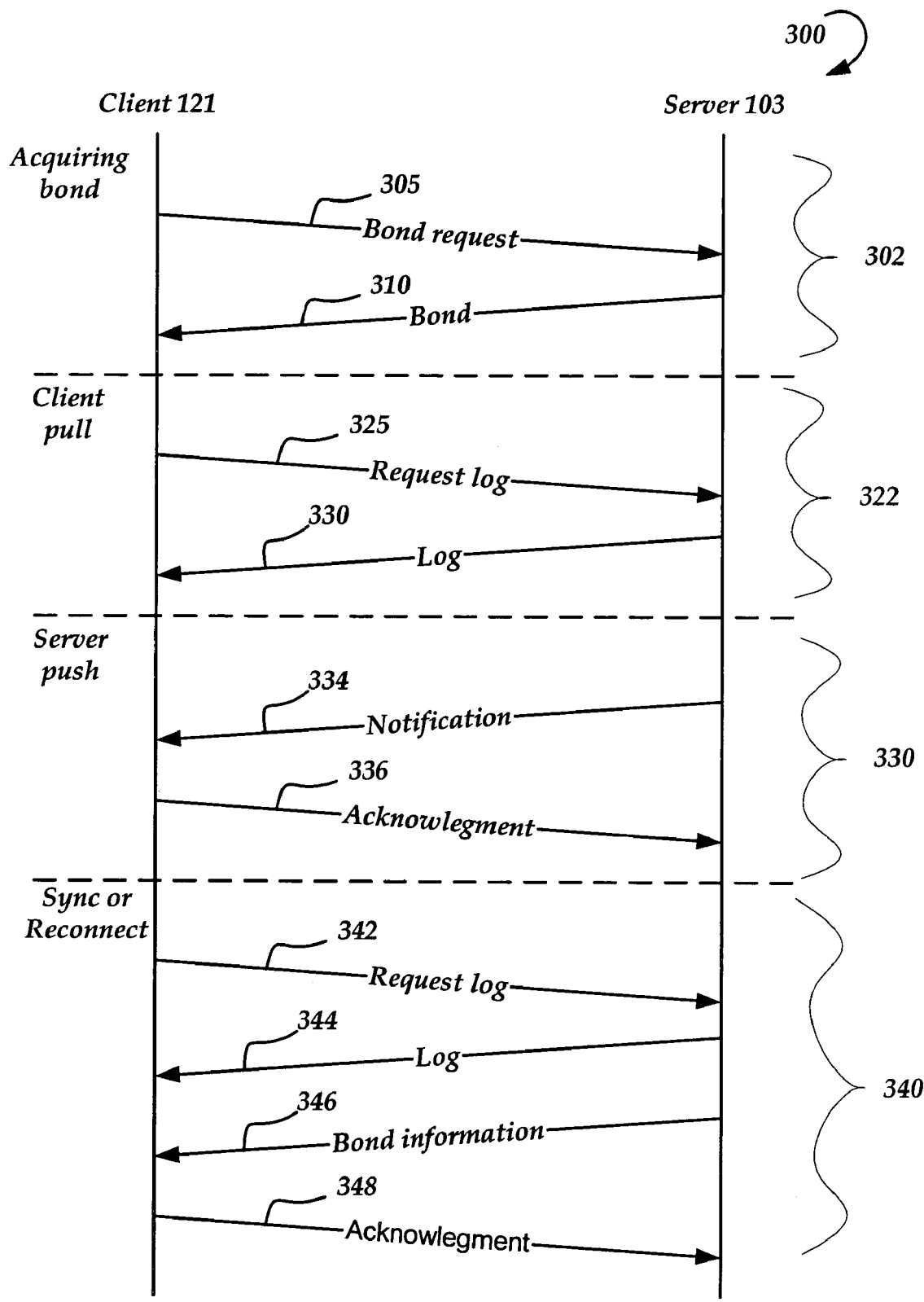
FIG. 3 is a schematic diagram of exemplary communications between a client and a server in a cached objects management system.

FIG. 3 is a schematic diagram of exemplary communications 300 between a client and a server in a cached objects management system, in accordance with one embodiment of the invention. Communications 300 may occur through a session that the client opened on the server. For illustrative purpose, the communications are shown to be between server 103 and client 121. However, in operation, the communications are actually between software components of a server and a client, such as between notification handler 141 and bond manager 105.

Communications 302 relate to acquiring notification bonds and include messages 305 and 310. As shown in the figure, client 121 may acquire a notification bond by sending a message 305 with a notification bond request. The notification bond is associated with an object managed by server 103 and cached by client 121. The notification bond enables client 121 to obtain notifications about file system events that relate to the modification of the object. Message 305 includes an identifier that identifies the object. The identifier may contain information about the file path of the object on server 103. Message 305 may also include the type of notification bonds that is desired. Each type of bonds may specify the data to include in the notifications.

In response to message 305, server 103 may establish a notification bond and send a message 310 with the notification bond to client 121. Message 310 may include states related to the notification bonds, such as a bond number (BN) that is uniquely associated with bond and a server aggregate bond number (ABN), which is a monotonically increasing number that is unique to client 121 with respect to server 103. Both server 103 and client 121 maintain an ABN. Comparing the client ABN and the server ABN enables client 121 and server 103 to determine whether there are missing bonds.

Communications 322 relate to providing notification to client 121 with a client pull configuration and include messages 325 and 330. In the client pull configuration, client 121 is configured to retrieve notifications in a notification log from a server 103. Client 121 may send message 325 that includes a request for a notification log associated with the notification bond. The notification log may include notifications associated with multiple notification bonds. In response, server 103 may send message 330 that includes the notification log. The notification log contains notifications for client 121 created in accordance with the notification bond. After receiving the notification log, client 121 may use the notifications in the notification log to update the cached object. Communications 330 relate to providing notification to client 121 with a server push configuration and include messages 334 and 336. In response to a file system event related to the modification of an object with a notification bond, server 103 determines a notification and sends message 334 with the notification to client 121. Message 315 may include a BN that identifies the object. Message 334 may also include data about the modification so that client 121 may update the corresponding cached object without additional communications with server 103. In response, client 121 may send message 336 to server 103 with an acknowledgment.

Communications 340 relate to providing notifications to client 121 in response to a reconnect operation and include messages 334 and 336. As part of the reconnect operation, client 121 may send message 342 that includes a request for a notification log associated with the notification bond. In response, server 103 may send message 344 that includes the notification log. Server 103 may send message 346 that includes states of the notification bonds that it has for client 121. Client 121 may use these states to discover notification bonds that are missing on the client and server 103 and to reacquire or reestablish the missing notification bonds. In response, client 121 may send message 348 that includes an acknowledgment.

Figure 4:
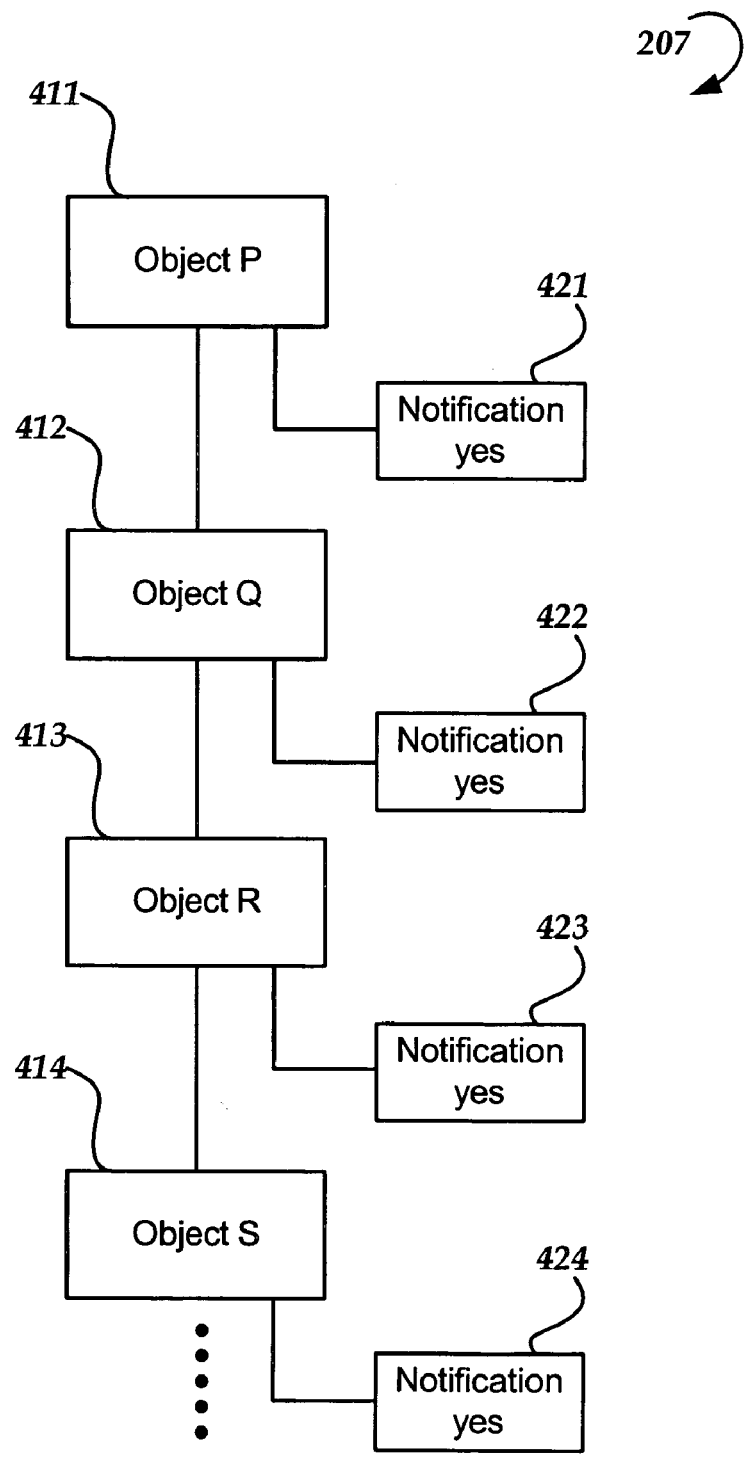
FIG. 4 is a schematic diagram of an exemplary filter table.

FIG. 4 is a schematic diagram of an exemplary filter table 207, in accordance with one embodiment of the invention. Filter table 207 enables a bond manager to determine which object is associated with a notification bond when the bond manager scans object-related events. As shown in the figure, filter table 400 is a data structure indexed by object identifiers, such as object identifiers 411-414. Object identifiers 411-414 may be file names or directory names, paths, hash of the names or path, or any other identifying values. Each of the object identifiers identifies an object and indexes an entry associated with the object. The entry may include a variety of data associated with the object. In this embodiment, the entry includes a Boolean identifier that indicates whether the object is associated with a notification bond. In another embodiment, filter table 207 may be simplified by only including object identifiers of objects that are associated with a notification bond. As shown in FIG. 4, object identifiers 411-414 identify Objects P, Q, R and S and the entries indicate that Objects P, Q and S are associated with notification bonds.

Figure 5:
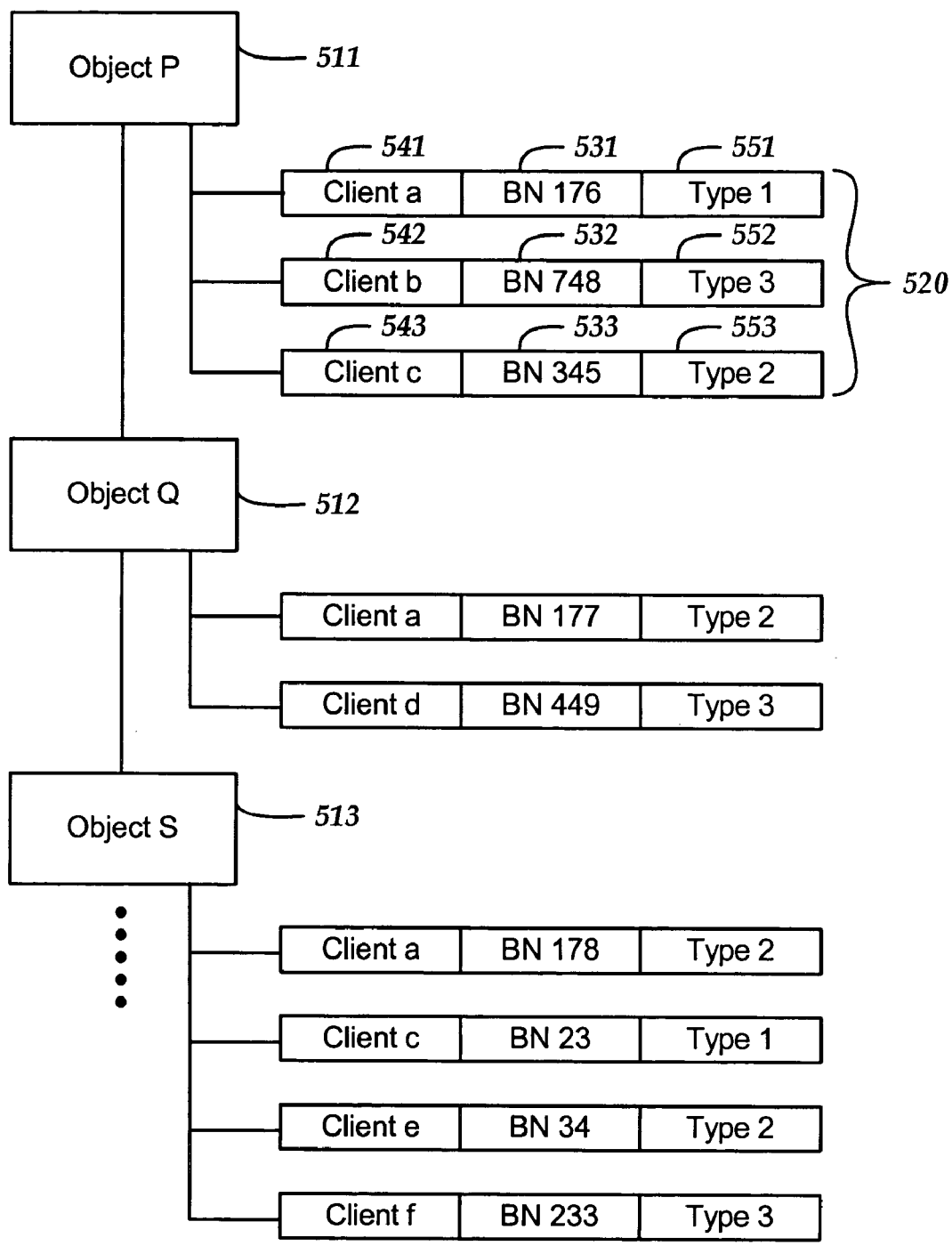
FIG. 5 is a schematic diagram of an exemplary server bond table.

FIG. 5 is a schematic diagram of an exemplary server bond table 215, in accordance with one embodiment of the invention. Server bond table 215 is a data structure maintained by a bond manager in a server for managing notification bonds. As shown in the figure, server bond table 215 is indexed by object identifiers, such as object identifiers 511-513. Each of the object identifiers identifies an object and indexes entries associated with the object, such as entries 520. Entries 520 may include client identifiers 541-543 that associate their corresponding entries with a particular client, bond numbers 531-533 that uniquely identify notification bonds, and bond type identifiers 551-553 that identify the type of notification bonds associated with their corresponding entries. As shown in FIG. 5, bond table 215 includes object identifier 511 that identifies Object P. Entries 520 indicate that Clients a, b, and c have notification bonds associated with Object P.

Figure 6:
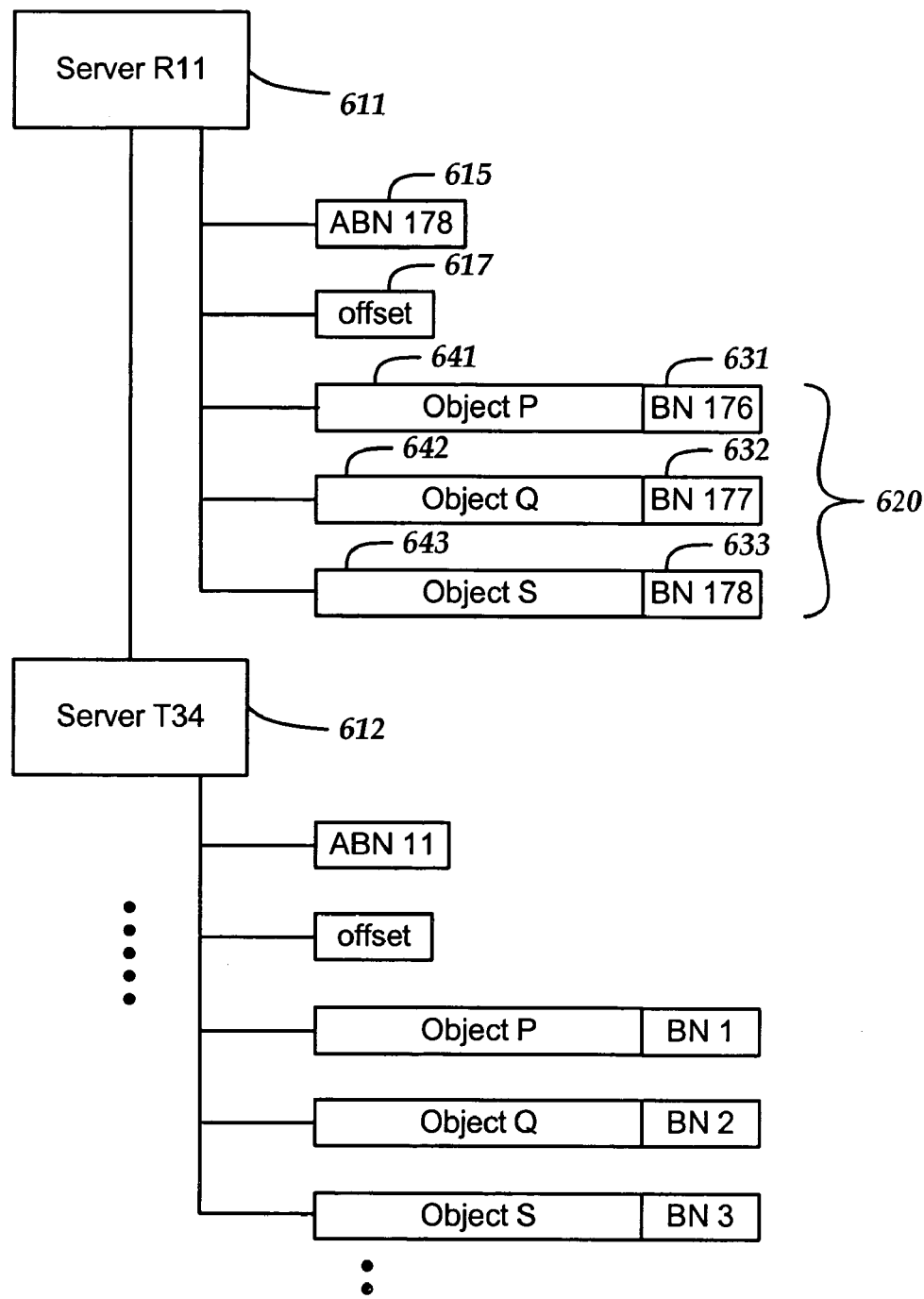
FIG. 6 is a schematic diagram of an exemplary client bond table.

FIG. 6 is a schematic diagram of an exemplary client bond table 220, in accordance with one embodiment of the invention. Client bond table 220 is a data structure maintained by a notification handler in a client for managing notification bonds. As shown in the figure, client bond table is a data structure indexed by server identifiers, such as server identifiers 611-612. Server identifiers 611-612 identify servers that have notification bonds with the client. As shown in the figure, server identifier 611 identifies server R11, which is associated with ABN identifier 615, offset 617, and entries 620.

ABN identifier 615 identifies an aggregate bond number associated with server R11. The aggregate bond number is monotonically increasing and enables the client to determine whether there are missing notification bonds. Offset 617 may be used to identify the last location in a notification log where notifications are received from a particular server. Offset 617 enables the client to commit after receiving notification from a server. This prevents the client from having to parse through an entire notification log on a server even when the notification log may include notifications that the client has already received. Offset 617 may be a pointer to a per-client notification log or a multiplexed notification log.

Entries 620 contain data that enable the client to manage notification bonds and to update the cached objects associated with the notification bonds. In this embodiment, the entries include object identifiers 641-643 and bond numbers 631-633. Object identifiers 641-643 identify the cached objects corresponding to the notification bonds. File paths for the cached objects may be encoded in object identifiers 641-643. Each of the bond numbers 631-633 uniquely identifies a particular notification bond between the client and server R11.

Figure 7:
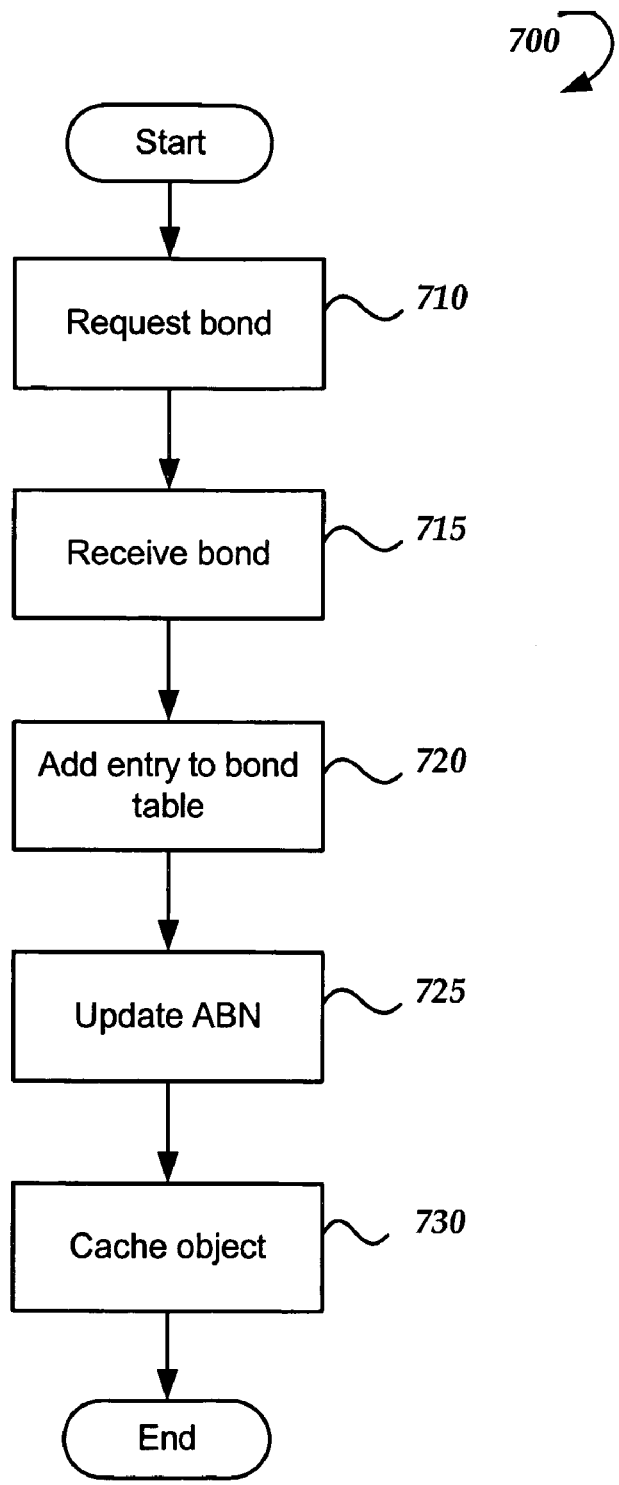
FIG. 7 is an operational flow diagram of a process for a client to establish a notification bond with a server for an object that is managed by the server.

FIG. 7 is an operational flow diagram of a process 700 for a client to establish a notification bond with a server for an object that is managed by the server, in accordance with one embodiment of the invention. The process may be implemented whenever the client caches an object or may require separate initiation by the client. Moving from a start block, process 700 moves to block 710 where a request is sent from the client to the server for a notification bond. At block 715, the notification bond is received from the server. The notification bond may include a bond number (BN) that uniquely identifies the notification bond. The notification bond may also include access information such as the file path of the object associated with the notification bond. At block 720, the client adds an entry to a client bond table. The entry contains data about the notification bond. At block 725, the client updates the aggregate bond number (ABN) associated with the server. In this embodiment, the ABN is the BN of the notification bond. At block 730, the client caches the object associated with the notification bond in memory. Process 700 then ends.

Figure 8:
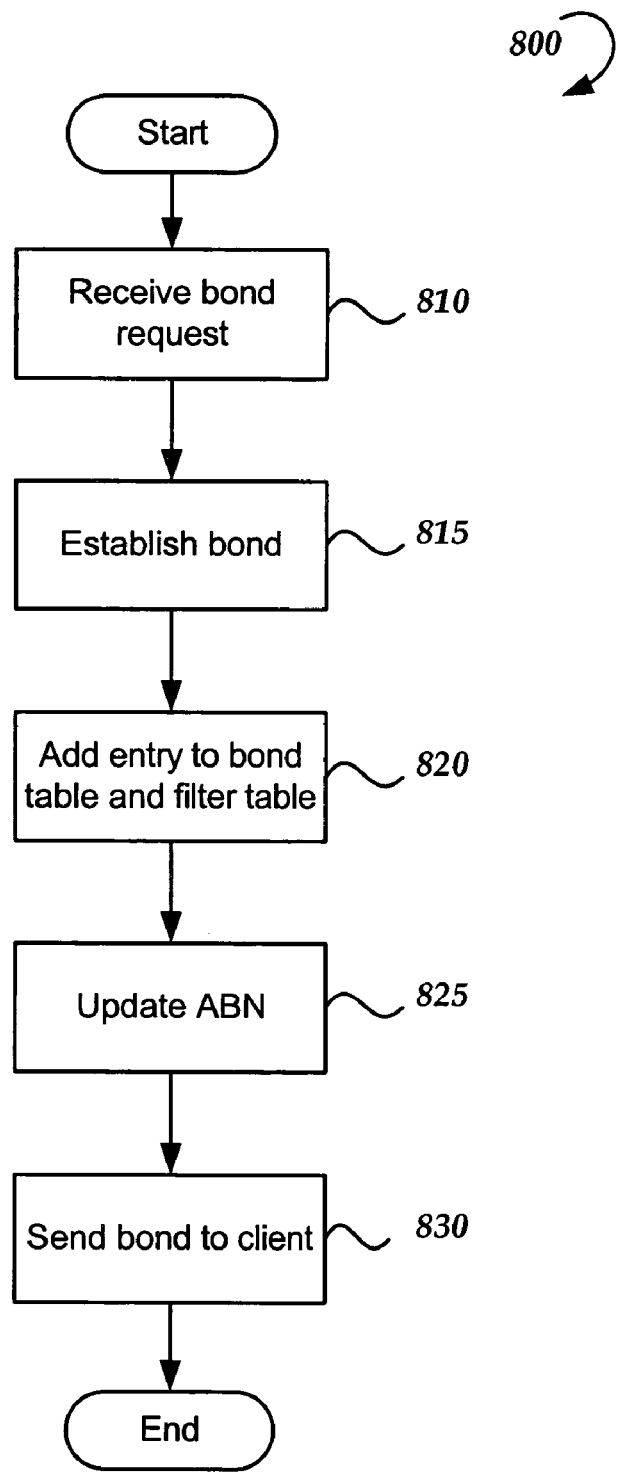
FIG. 8 is an operational flow diagram of a process for a server to establish a notification bond with a client for an object.

FIG. 8 is an operational flow diagram of a process 800 for a server to establish a notification bond with a client for an object, in accordance with one embodiment of the invention. The process may be implemented when the client request to cache an object or in response to a separate initiation by the client.

Moving from a start block, process 800 moves to block 810 where a bond request is received from the client. At block 815, a notification bond is established. At block 820, an entry is added to a server bond table. An entry may also be added to a filter table. At block 825, the ABN unique to the client is updated. At block 830, the notification bond is sent to the client. Then, process 800 ends.

Figure 9:
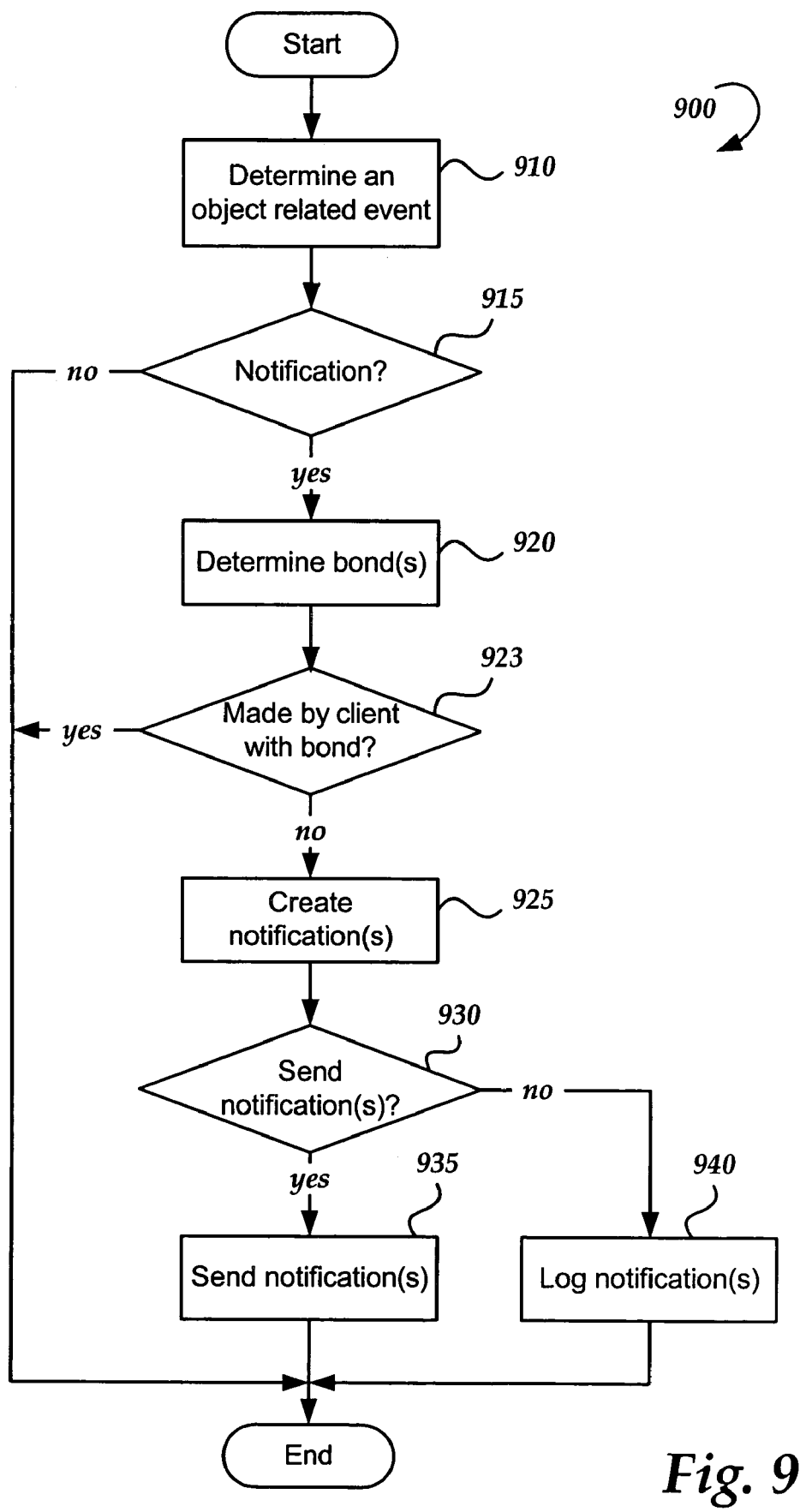
FIG. 9 is an operational flow diagram of a process for a server to send a notification to a client.

FIG. 9 is an operational flow diagram of a process 900 for a server to send a notification to a client, in accordance with one embodiment of the invention. Moving from a start block, process 900 continues at block 910 where an object related event associated with an object is determined. At decision block 915, a determination is made whether notification is required for the notification event. This determination may be made by checking whether the object is referenced in a filter table. If notification is not required, the process ends.

Returning to decision block 915, if notification is required for the object-related event, process 900 continues at block 920 where one or more notification bonds associated with the object are determined. The determination may be made by checking entries in a server bond table. There could be more than one notification bond because multiple clients may have cached the object and obtained a notification bond. The process as described below is applicable for each client that has a notification bond.

At decision block 923, a determination is made whether the object related event was caused by the client with a notification bond on the object. If so, the client already knows about the object related event and no notification is sent to that client. If that client is the only client with a notification bond, process 900 ends. Otherwise, the process continues at block 925.

Returning to decision block 923, if the object related event was not caused by any client with a notification bond on the object, process 900 moves to block 925. At block 925, notifications are created based on data in the server bond table.

At decision block 930, a determination is made whether to send the notification to the client. This determination is not necessary if the server is configured to record all notifications in notification logs. However, if the server is configured to send notifications directly to clients under certain conditions, the determination is positive if those conditions exist. The determination may become negative if a disconnect occurred while a notification was being sent.

If the determination is positive, process 900 moves to block 935 where a notification is sent to each of the clients and ends. Returning to decision block 930, if the determination is negative, the notification associated with that client is sent to a notification log. Blocks 935 and 940 may both execute and may apply to multiple clients. Process 900 then ends.

Figure 10:
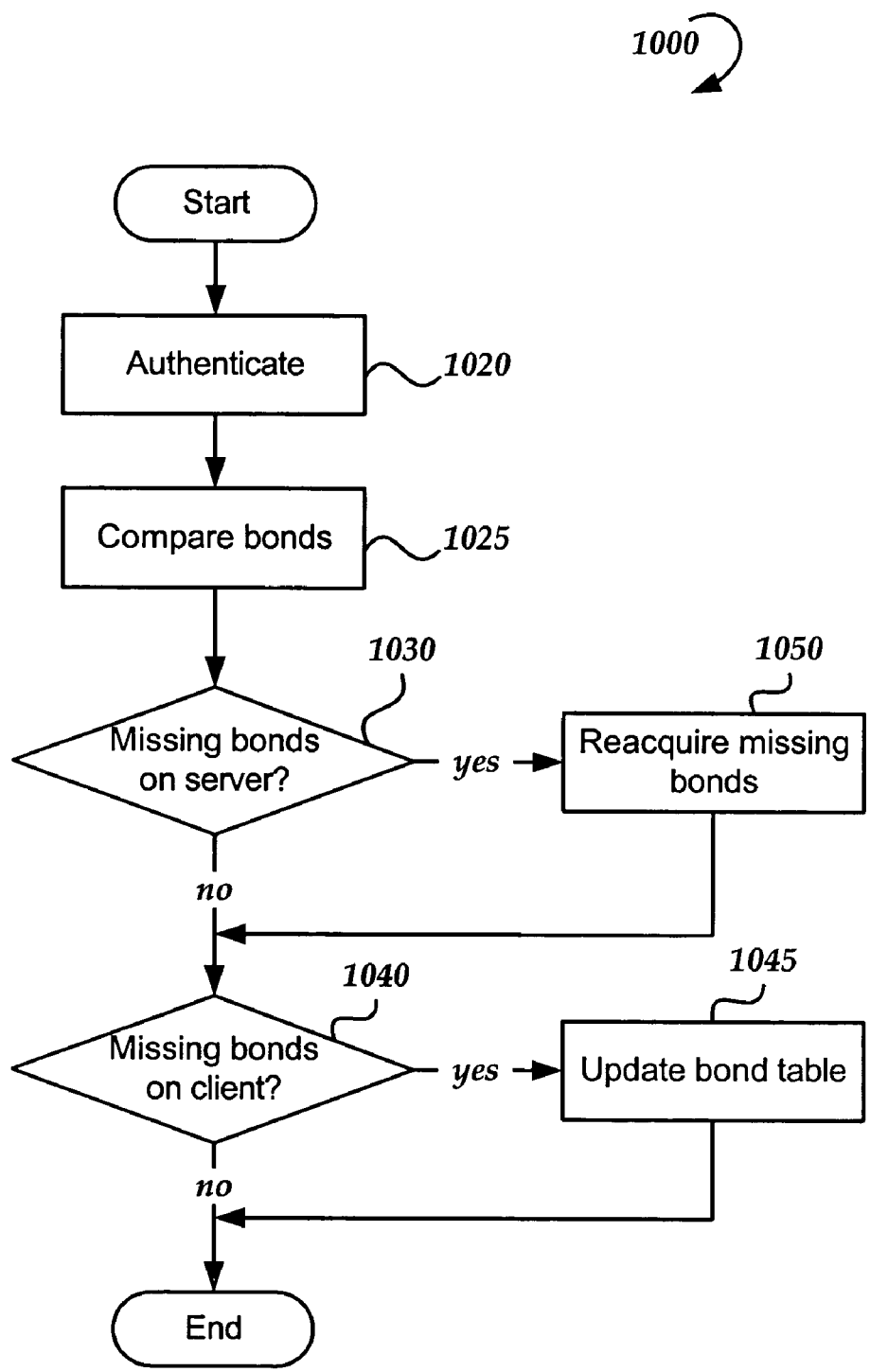
FIG. 10 is a schematic diagram of a process for a client to synchronize its cached objects with a server

FIG. 10 is a schematic diagram of a process 1000 for a client to reconnect to a server, in accordance with one embodiment of the invention. Process 1000 may be automatically implemented by the client upon reconnecting to the server after a period of being disconnected. Process 1000 may also be implemented in response to a separate initiation by the client, or to an external event, such as prompting by the server when the size of a notification log reaches a pre-determined value. Moving from a start block, process 1000 continues at block 1020 where the client and the server are mutually authenticated. At block 1025, the notification bonds on the client and those on the server are compared to ascertain whether there are missing notification bonds. Notification bonds may be missed if data about the notification bonds were lost due to system crashes or other failures. In one embodiment, the comparison is made by comparing the client ABN with the server ABN.

At decision block 1030, a determination is made whether there are missing notification bonds on the server. The client ABN being larger than the server ABN is an indication that there are missing notification bonds on the server. For example, if the client asserts notification bonds represented by BNs that are larger than the ABN asserted by the server, the notification bonds asserted by the client are the ones about which the server does not know.

If there are missing notification bonds, process 1000 continues at block 1050 where the missing notification bonds are reacquired from the server. For example, the client may initiate process 700, previously discussed in conjunction with FIG. 7, to reacquire the notification bonds. The client may also discard those notifications bonds and the cache objects associated with them. The process continues at block 1040.

Returning to decision block 1030, if there are no missing bonds on the server, process 1000 moves to block 1040 where a determination is made whether there are missing bonds on the client. The client ABN being smaller than the server ABN is an indication that there are missing notification bonds on the client. For example, if the server asserts notification bonds represented by BNs that are larger than the ABN asserted by the client, the notification bonds asserted by the server are the ones about which the client does not know. If there are no missing bonds on the client, the process ends. If there are missing notification bonds on the client, process 1000 continues at block 1045 where the client bond table is updated to remove those missing notification bonds. The client may also cache the objects associated with the missing notification bonds or discard the bonds. The process then ends.

Figure 11:
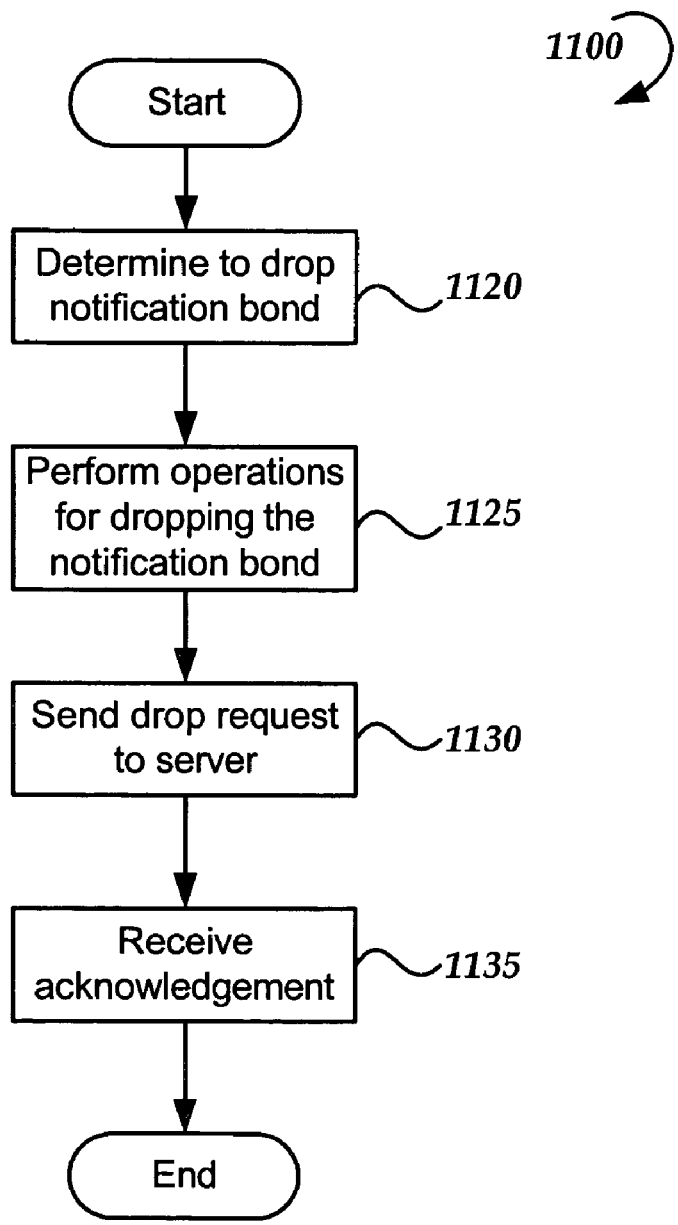
FIG. 11 is a schematic diagram of a process for a client to drop a notification bond.

FIG. 11 is a schematic diagram of a process 1100 for a client to drop a notification bond, in accordance with one embodiment of the invention. Process 1100 may be implemented by a client to drop one or more notification bonds. For illustrative purpose, process 1100 will be described in the context of dropping a single notification bond. Moving from a start block, process 1100 goes to block 1120 where a determination is made to drop a notification bond. The client may wish to drop a notification bond for a number of reasons. For example, if a client has determined that there is no further need for a particular cached object, the client may delete the cached object and drop the associated notification bond. At block 1125, the client performs operations for dropping the notification bond. For example, the client may delete data associated with the notification bond from the various tables for implementing the notification bond. At block 1130, the client sends a request to the server for dropping the notification bond. To maintain consistency, the client may perform the operations in block 1125 to commit to dropping the notification bond before sending a drop request to the server in block 1130. In response, the server may send an acknowledgment to the request, as shown in block 1135. The process then ends.

Figure 12:
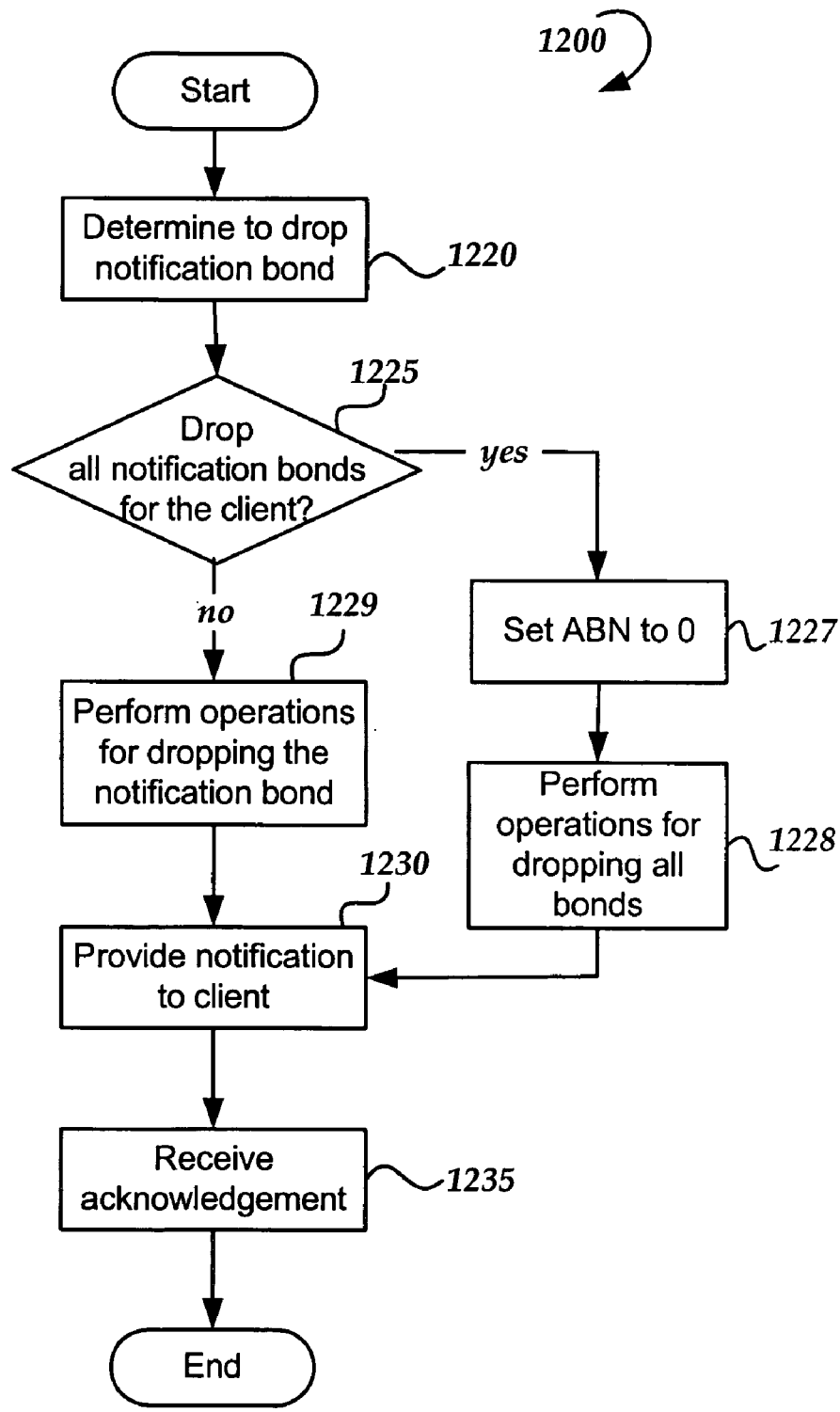
FIG. 12 is a schematic diagram of a process for a server to drop a notification bond; in accordance with embodiments of the invention.

FIG. 12 is a schematic diagram of a process 1200 for a server to drop a notification bond, in accordance with one embodiment of the invention. Process 1200 may be implemented by a server to drop one or more notification bonds. Moving from a start block, process 1200 goes to block 1220 where a determination is made to drop a notification bond. The server may wish to drop a notification bond for many different reasons. For example, if the server has stopped managing an object, the server may drop notification bonds associated with that object. The server may drop notification bonds associated with a particular client if that client has not contacted the server for an extended period of time.

At decision block 1225, a determination is made whether all notification bonds associated with a particular client are being dropped. If not, process 1200 continues at block 1229. At block 1229, the server performs operations for dropping the notification bond. The process then moves to block 1230.

Returning to decision block 1225, if all notification bonds associated with the particular client are being dropped, the process goes to block 1227 where the ABN associated with the client is set to 0. Process 1200 continues at block 1228 where the server performs operations for dropping all notification bonds associated with the client. The process then moves to block 1230.

At block 1230, the server provides a notification to the client about dropping a particular notification bond or all of the client's notification bonds. The notification may be provided by recording the notification in a notification log. To maintain consistency, the client may perform the operations in block 1228 or block 1229 to commit to dropping the notification bonds before sending a notification to the client in block 1230. The server may receive an acknowledgment from the client, as shown in block 1235. The process then ends.

In conclusion, the present invention enables clients to cache a large number of objects and rapidly synchronize the cached objects with the corresponding objects on a server. The capacity and the efficiency of the present invention is achieved in part by enabling the clients to know which cached objects were modified on the server and required to be updated. Notification bonds are used to ensure that changes made to objects that are cached are communicated to the clients. Persistent shared notification bond states enable the server and the clients to reestablish the notification bonds to survive a restart and reboot of the clients and the server. The present invention also minimizes traffic in situations where a client is only interested in caching a fraction of the content in a server.

The above specification, examples and data provide a complete description of the invention. Since many embodiments of the invention can be made without departing from the spirit and scope of the invention, the invention resides in the claims hereinafter appended.

What is claimed is:

1. A computer-implemented method for a client to interact with a server, the computer-implemented method comprising:
   creating a cached object from an original object, the original object being managed by the server; wherein the client interacts with a plurality of cached objects that are created on the client from objects managed by the server;
   creating a bond manager on the server, the bond manager including:
      a filter component configured to scan for incoming and outgoing events related to shared files from a file system manager of the server and forward the events to a service component; and the service component configured to receive events from the filter component and establish notification bonds with the client, the service component maintaining a server bond table, wherein the server bond table includes a server identifier, a server aggregate bond number, and a notification log offset identifying a location within a notification log;

establishing a notification bond associated with the original object with the server, the notification bond enabling the client to obtain a notification from the bond manager on the server in response to an object related event associated with the original object; wherein the notification bond remains persistent through a reboot of the client and server and the object related event is associated with an edit of the original object, the notification bond established after determining the notification bond to be missing by comparing a client aggregate bond number with the server aggregate bond number; and wherein the original object is associated with a different notification bond from the objects that have established notification bonds; and updating the cached object with a change to the original object after the change is made to the original object.

2. The computer-implemented method of claim 1, wherein the object related event includes when the original object has been modified.

3. The computer-implemented method of claim 1, wherein establishing the notification bond is performed in response to creating the cached object.

4. The computer-implemented method of claim 1, further comprising:
obtaining a notification from the server; and
updating the cached object using the notification.

5. The computer-implemented method of claim 1, wherein obtaining the notification includes retrieving the notification log containing the notification.

6. The computer-implemented method of claim 1, further comprising:
reconnecting with the server after a disconnected period of time;
requesting the notification log containing a notification; and
synchronizing the cache object with the original object using the notification.

7. The computer-implemented method of claim 1, further comprising maintaining states associated with the notification bond.

8. The computer-implemented method of claim 7, wherein the states are maintained in a persistent medium.

9. The computer-implemented method of claim 8, wherein the states include a bond number that uniquely identifies the notification bond.

10. The computer-implemented method of claim 8, wherein the aggregate bond number is unique to the client.

11. The computer-implemented method of claim 8, further comprising reestablishing the states on the client after a restart.

12. The computer-implemented method of claim 11, further comprising synchronizing the states on the client and corresponding states on the server.

13. A computer-implemented method for a server to interact with a client, the computer-implemented method comprising:
creating a bond manager on the server, the bond manager including:
a filter component configured to scan for incoming and outgoing events related to shared files from a file system manager of the server and forward the events to a service component; and
the service component configured to receive events from the filter component and establish notification bonds with the client, the service component maintaining a server bond table, wherein the server bond table includes a server identifier, a server aggregate bond number, and a notification log offset identifying a location within a notification log;

establishing a notification bond associated with an object object with the client, the notification bond enabling the client to obtain a notification from the server in response to an object related event associated with the object; wherein the notification bond associated with the object remains persistent through a reboot and the object related event is associated with an edit of the object, the notification bond established after determining the notification bond to be missing by comparing a client aggregate bond number with the server aggregate bond number; and enabling the client to cache the object.

14. The computer-implemented method of claim 13, wherein the object related event includes when the object has been modified.

15. The computer-implemented method of claim 13, wherein establishing the notification bond is performed in response to a request from the client to cache the object.

16. The computer-implemented method of claim 13, further comprising:
determining an object related event that was not caused by the client;
creating a notification in accordance with the notification bond; and
providing the notification to the client.

17. The computer-implemented method of claim 13, further comprising:
determining an object related event that was not caused by the client;
creating a notification in accordance with the notification bond; and
recording the notification in the notification log.

18. The computer-implemented method of claim 17, further comprising:
establishing a connection with the client; and
sending the notification log to the client.

19. A distributed file system for sharing objects, comprising:
a client configured to create a cached object associated with an original object, the client including a notification handler configured to maintain a notification bond associated with the original object and
a server that includes a processor and storage medium encoded with instructions to manage original objects, the server including a bond manager configured to issue the notification bonds to the client, the bond manager comprising:
a filter component configured to scan for incoming and outgoing events related to shared files from a file system manager of the server and forward the events to a service component; and
the service component configured to receive events from the filter component and establish the notification bond with the client, the service component maintaining a server bond table, wherein the server bond table includes a server identifier, a server aggregate bond number, and a notification log offset identifying a location within a notification log;

and the notification bond being associated with the original original object and enabling the client to obtain a notification from the server in response to an object related event associated with the original original object in which the notification bond is associated; wherein the notification bond associated with the original object remains persistent through a reboot and the object related event is associated with an edit of the original object the notification bond established after determining the notification bond to be missing by comparing a client aggregate bond number with the server aggregate bond number.

20. The distributed file system of claim 19, wherein the bond manager is configured to provide notifications to the clients in accordance with the notification bonds.

21. The distributed file system of claim 19, wherein the storage medium of the server further comprises instructions that describe the file system manager configured to manage the original objects and wherein the bond manager monitors communication traffic associated with the file system manager.

22. The distributed file system of claim 19, wherein the the bond table includes states that relate each notification bond with an original object and a client to whom the notification is to be provided.

23. The distributed file system of claim 19, wherein the notification log includes notifications for the client.

24. The distributed file system of claim 19, wherein the notification handler is configured to obtain from the server the notification log associated with the notification bond and to update the cached object in accordance with the notification log.

25. The distributed file system of claim 24, wherein the notification log includes notifications associated with a plurality of notification bonds.

26. The distributed file system of claim 19, wherein the notification handler is configured to maintain a bond table and wherein the bond table includes states that relate each notification bond with a cached object and a server that manages an original object corresponding to the cached object.

27. A computer-readable storage medium encoded with a data structure and computer-executable instructions to perform the method of:
creating a cached object from an original object, the original object being managed by a server; wherein a client interacts with a plurality of cached objects that are created on the client from objects managed by the server;
creating a bond manager on the server, the bond manager including:
a filter component configured to scan for incoming and outgoing events related to shared files from a file system manager of the server and forward the events to a service component; and
the service component configured to receive events from the filter component and establish notification bonds with the client, the service component maintaining a server bond table, wherein the server bond table includes a server identifier, a server aggregate bond number, and a notification log offset identifying a location within a notification log;
establishing a notification bond associated with the original object with the server, the notification bond enabling the client to obtain a notification from the bond manager on the server in response to an object related event associated with the original object; and
accessing a first indexing data field containing object identifiers, each object identifier uniquely identifying an object that is managed by the server; and
accessing a second data field containing entries, each entry being indexed to an object identifier in the first indexing data field and containing states associated with the notification bond associated with a particular object between the server and the client that caches the object identified by the object identifier;
wherein the first indexing data field and the second data field are created by the server and wherein the server accesses the first indexing data field and the second data field to determine what objects on the client require notification in response to an object related edit event and wherein the notification bond associated with the particular object remains persistent through a reboot, the notification bond established after determining the notification bond to be missing by comparing a client aggregate bond number with a server aggregate bond number.

28. The computer-readable medium of claim 27, wherein each object identifier in the first indexing data field includes a file path associated with an object.

29. The computer-readable medium of claim 28, wherein each object identifier includes a hash of the file path.

30. The computer-readable medium of claim 27, wherein each entry of the second data field includes a bond number that uniquely identifies a notification bond.

31. The computer-readable medium of claim 27, wherein each entry of the second data field includes a client identifier that identifies a client associated with a notification bond.

32. The computer-readable medium of claim 27, wherein each entry of the second data field includes a type identifier that identifies a type associated with a notification bond.

33. A computer-readable storage medium encoded with a data structure and computer-executable instructions to perform the method of:
creating a cached object from an original object, the original object being managed by a server; wherein a client interacts with a plurality of cached objects that are created on the client from objects managed by the server;
creating a bond manager on the server, the bond manager including:
a filter component configured to scan for incoming and outgoing events related to shared files from a file system manager of the server and forward the events to a service component; and
the service component configured to receive events from the filter component and establish notification bonds with the client, the service component maintaining a server bond table, wherein the server bond table includes a server identifier, a server aggregate bond number, and a notification log offset identifying a location within a notification log;
establishing a notification bond associated with the original object with the server, the notification bond enabling the client to obtain a notification from the bond manager on the server in response to an object related event associated with the original object; and
accessing a first indexing data field containing server identifiers, each server identifier uniquely identifying a server that manages an original object, the original object being cached by a client; and
accessing a second data field containing entries, each entry being indexed to a server identifier in the first indexing data field and containing states associated with a notification bond associated with a particular object between the client and a server identified by the server identifier, the notification bond being associated with a cached object created by the client from an original object;

wherein the first indexing data field and the second data field are accessed by a computing device and wherein the computing device uses the first indexing data field and the second data field in updating objects in response to an object related edit event and wherein the notification bond associated with the particular object remains persistent through a reboot, the notification bond established after determining the notification bond to be missing by comparing a client aggregate bond number with a server aggregate bond number.

34. The computer-readable medium of claim 33, wherein each entry of the second data field includes a bond number that uniquely identifies a notification bond.

35. The computer-readable medium of claim 33, wherein each entry of the second data field includes an original object identifier that identifies an original object.

36. The computer-readable medium of claim 33, wherein each entry of the second data field includes a cached object identifier that identifies a cached object associated with an original object.

37. The computer-readable medium of claim 33, further comprising a third data field that includes an aggregated bond number.

38. A distributed file system for sharing objects, comprising:

means for a client to cache an original object managed by a server; wherein the client includes means for interacting with a plurality of cached objects that are created on the client from objects managed by the server;

means for creating a bond manager on the server, the bond manager including:

a filter component configured to scan for incoming and outgoing events related to shared files from a file system manager of the server and forward the events to a service component; and the service component configured to receive events from the filter component and establish notification bonds with the client, the service component maintaining a server bond table, wherein the server bond table includes a server identifier, a server aggregate bond number, and a notification log offset identifying a location within a notification log;

means for establishing a notification bond associated with the original object with the server and the client, the notification bond enabling the client to obtain a notification from the server in response to an object related event associated with the original object in which the notification bond is associated;

wherein the notification bond remains persistent through a reboot, the notification bond established after determining the notification bond to be missing by comparing a client aggregate bond number with a server aggregate bond number and the object related event is associated with an edit of the original object; and updating each of the cached objects with the original objects after a change is made to the original object.

39. The distributed file system of claim 38, further comprising:

means for obtaining a notification from the server; and
means for updating the cached object using the notification.

40. The distributed file system of claim 38, further comprising:

means for reconnecting with the server after a disconnected period of time;

means for requesting a notification log containing a notification; and means for synchronizing the cache object using the notification.

41. The distributed file system of claim 38, further comprising:

means for determining an object related event;
means for creating a notification in accordance with the notification bond; and
means for providing the notification to the client.

42. The distributed file system of claim 38, further comprising:

means for determining an object related event;
means for creating a notification in accordance with the notification bond; and
means for recording the notification in the notification log.

43. The distributed file system of claim 38, further comprising:

means for establishing a connection with the client; and
means for sending the client the notification log.

44. The distributed file system of claim 38, further comprising:

means for the client to drop the notification bond.

45. The distributed file system of claim 38, further comprising:

means for the server to drop the notification bond.

46. The distributed file system of claim 38, further comprising:

means for the server to drop all notification bonds associated with the client.

47. The distributed file system of claim 46, further comprising:

means for the server to reset clear states associated with the dropped notification bonds.

48. A computer-implemented method for maintaining cached objects that correspond to original objects managed by a server, the computer-implemented method comprising:

creating cached objects from original objects;

establishing a plurality of notification bonds, each associated with a particular one of the cached objects, between the server and the computer, the notification bonds enabling the client to obtain a notification from the server in response to an object related event associated with the original object in which the notification bond is associated; wherein the plurality of notification bonds between the server and the computer that are associated with one of the cached objects each remain persistent through a reboot of the client and server and the object related event is associated with an edit of the original object; and wherein each object includes is associated with a different one of the plurality of notification bonds;

reestablishing a communication link between the client and the server after a period of time without a communication link;

determining at least one notification bond is missing by comparing a client aggregate bond number with a server aggregate bond number;

re-establishing the at least one notification bond;

obtaining notifications from the server about changes made to at least one of the original objects during the period of time; and synchronizing a cache object corresponding to the at least one original object using the notifications, without synchronizing all of the cached objects.

49. A computer-implemented method for synchronizing cached objects maintained by a client with the corresponding original objects maintained by a server, the computer-implemented method comprising:

creating cached objects from original objects;

establishing a notification bond associated with one of the original objects with the server for each of the cached objects, the notification bond enabling the client to obtain a notification from the server in response to an edit associated with the original object;

determining the notification bond is missing by comparing a client aggregate bond number with a server aggregate bond number, wherein the notification bond associated with the original objects remains persistent through a reboot of the client and server and the edit is associated with a modification of the original object; wherein each object includes a notification bond; and wherein the edit to the object is one of an edit to a word processing document, an edit to a spreadsheet document; or an edit to an image file;

persistently maintaining, by the server, a server identifier, a server aggregate bond number, a notification log offset identifying a location within the notification log, and server bond states related to the original objects; the server bond states corresponding to the notification bonds associated with the original objects, each notification bond enabling the client to obtain a notification from the server when at least one of the original object has been modified wherein a copy of the original object is synchronized and maintained on the client after the object has been edited by a user associated with the server; and persistently maintaining, by the client, client bond states corresponding to the server bond states.

50. The computer-implemented method of claim 49, further comprising reestablishing the server bond states after a server reboot or restart.

51. The computer-implemented method of claim 50, further comprising recovering notifications associated with the notification bonds after a server reboot or restart.

52. The computer-implemented method of claim 49, further comprising reestablishing the client bond states after a client reboot or restart.

53. The computer-implemented method of claim 52, further comprising recovering notifications associated with the notification bonds after a server reboot or restart.

54. The computer-implemented method of claim 49, further comprising determining, by a server, to drop a notification bond;

performing, by the server, an operation to drop the notification bond; and providing, by the server, a notification to the client for dropping the notification bond.

55. The computer-implemented method of claim 54, wherein performing the operation commits the server to dropping the notification bond.

56. The computer-implemented method of claim 55, wherein performing the operation is completed before providing the notification to the client.

57. The computer-implemented method of claim 49, further comprising determining, by the server, to drop all notification bonds associated with the client;

performing, by the server, an operation to drop the notification bonds; and providing, by the server, a notification to the client for dropping the notification bonds.

58. The computer-implemented method of claim 57, wherein performing the operation commits the server to dropping the notification bonds.

59. The computer-implemented method of claim 58, wherein performing the operation is completed before providing the notification to the client.

60. The computer-implemented method of claim 49, further comprising determining, by the client, to drop a notification bond;

performing, by the client, an operation to drop the notification bond; and requesting the server to drop the notification bond.

61. The computer-implemented method of claim 60, wherein performing the operation commits the client to dropping the notification bond.

62. The computer-implemented method of claim 61, wherein performing the operation is completed before requesting a server to drop the notification bond.

* * * * *